United States Patent
Ito

(10) Patent No.: US 9,019,264 B2
(45) Date of Patent: Apr. 28, 2015

(54) ELECTRO-OPTICAL DEVICE AND ELECTRONIC APPARATUS

(75) Inventor: Akihiko Ito, Tatsuno-machi (JP)

(73) Assignee: Seiko Epson Corporation, Tokyo (JP)

( * ) Notice: Subject to any disclaimer, the term of this patent is extended or adjusted under 35 U.S.C. 154(b) by 203 days.

(21) Appl. No.: 13/541,526

(22) Filed: Jul. 3, 2012

(65) Prior Publication Data

US 2013/0010007 A1   Jan. 10, 2013

(30) Foreign Application Priority Data

Jul. 8, 2011 (JP) ................................. 2011-151729

(51) Int. Cl.
  *G06T 15/00* (2011.01)
  *G09G 3/00* (2006.01)
  *G09G 3/36* (2006.01)

(52) U.S. Cl.
  CPC ............... *G09G 3/003* (2013.01); *G06T 15/00* (2013.01); *G09G 3/3614* (2013.01); *G09G 3/3648* (2013.01); *G09G 2310/0205* (2013.01)

(58) Field of Classification Search
  CPC .... G06T 15/00; H04N 13/00; H04N 13/0438; G09G 3/3614; G09G 2310/0205
  USPC ................................................... 345/419, 96
  See application file for complete search history.

(56) References Cited

U.S. PATENT DOCUMENTS

| 4,651,148 | A | * | 3/1987 | Takeda et al. ................... 345/92 |
| 4,724,433 | A | * | 2/1988 | Inoue et al. .................... 345/208 |
| 5,365,284 | A | * | 11/1994 | Matsumoto et al. .......... 348/793 |
| 5,742,270 | A | * | 4/1998 | Kuo ............................. 345/100 |
| 2004/0041760 | A1 | * | 3/2004 | Tsumura et al. ................ 345/87 |
| 2010/0066820 | A1 | * | 3/2010 | Park et al. ........................ 348/53 |
| 2011/0018859 | A1 | | 1/2011 | Ito |
| 2011/0128259 | A1 | * | 6/2011 | Suzuki et al. ................ 345/204 |
| 2011/0227957 | A1 | * | 9/2011 | Jung et al. .................... 345/690 |
| 2011/0292041 | A1 | * | 12/2011 | Lee et al. ...................... 345/419 |
| 2012/0075259 | A1 | * | 3/2012 | Chung .......................... 345/204 |

FOREIGN PATENT DOCUMENTS

| JP | 2009-025436 A | 2/2009 |
| JP | 2011-027810 A | 2/2011 |

* cited by examiner

*Primary Examiner* — Chanh Nguyen
*Assistant Examiner* — Yuzhen Shen
(74) *Attorney, Agent, or Firm* — Maschoff Brennan

(57) ABSTRACT

In one unit period of a display period, each first pair of scanning lines is selected and a gray scale potential corresponding to pixels of one scanning line of the first pair of scanning lines is supplied to each signal line. In another unit period, each second pair of scanning lines is selected and a gray scale potential corresponding to pixels of one scanning line of the second pair of scanning lines is supplied to each signal line.

3 Claims, 10 Drawing Sheets

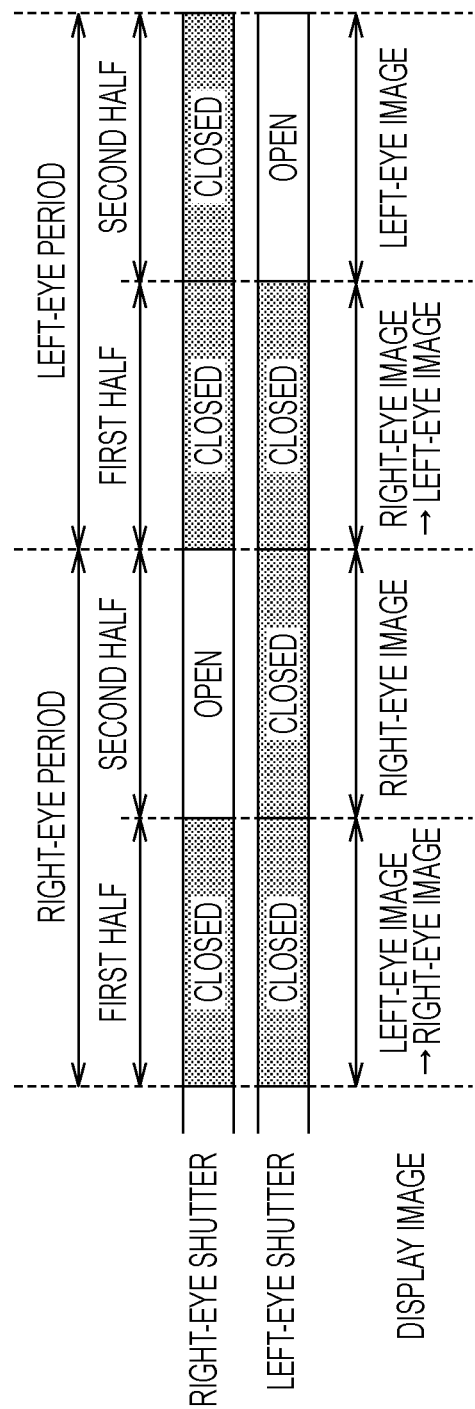

ELECTRO-OPTICAL DEVICE AND ELECTRONIC APPARATUS

BACKGROUND

1. Technical Field

The present invention relates to a technique of displaying right-eye image and left-eye image having a mutual parallax effect so that an observer can perceive a stereoscopic effect.

2. Related Art

Hitherto, frame sequential type stereoscopic viewing methods of alternately displaying the right-eye image and the left-eye image in a time-division manner have been suggested. In a period in which one of the right-eye image and the left-eye image is changed to the other thereof, the right-eye image and the left-eye image are merged. Therefore, when a viewer views the right-eye image and the left-eye image, it may be difficult for the viewer to perceive a clear stereoscopic effect (crosstalk). In order to resolve this problem, for example, JP-A-2009-25436 discloses a technique of closing both right-eye shutter and left-eye shutter of stereoscopic viewing glasses in a period (that is, a period in which the right-eye and the left-eye image are merged) in which one of the right-eye and the left-eye image is changed to the other thereof, so that a viewer may not perceive the right-eye image and the left-eye image.

Specifically, as shown in FIG. 12, a right-eye period corresponding to the right-eye image and a left-eye period corresponding to the left-eye image are alternately set. A display image is updated from the left-eye image to the right-eye image in the first-half period of the right-eye period and the right-eye image is displayed in the second-half period of the right-eye period. The display image is updated from the right-eye image to the left-eye image in the first-half period of the left-eye period and the left-eye image is displayed in the second-half period of the left-eye period. In the first-half period of each of the right-eye and left-eye periods, both the right-eye shutter and left-eye shutter are controlled so as to be in the closed state. Accordingly, it may be difficult for the viewer to perceive the merging (crosstalk) of the right-eye image and the left-eye image.

In the technique disclosed in JP-A-2009-25436, however, the period in which the viewer can actually perceive the image is restricted to the second-half period (that is, about half) of each of the right-eye and left-eye periods. Accordingly, a problem may arise in that it is difficult to sufficiently ensure the brightness of the display image. Further, to realize a stereoscopic (3D) display process of alternately displaying the right-eye image and the left-eye image, the transmission speed of an image signal and the process speed of a driving circuit has to increase the speed of a planar (2D) display at the frame frequency of image display by double or more. Therefore, a problem may arise in that the circuit size or the manufacturing cost of the driving circuit increases.

SUMMARY

An advantage of some aspects of the invention is that it provides a technique of improving the brightness of a display image without an increase in a process speed, while preventing a viewer from perceiving merging of the right-eye image and the left-eye image.

According to an aspect of the invention, there is provided an electro-optic device alternately displaying the right-eye image and the left-eye image in each display period. The electro-optic device includes a plurality of scanning lines; a plurality of signal lines; a plurality of pixels that are arranged to correspond to intersections between the plurality of scanning lines and the plurality of signal lines; a scanning line driving circuit that sequentially selects first combination of the plurality of scanning lines which being formed by two scanning lines adjacent to each other in a first unit period and sequentially selects second combination of the scanning lines which being formed by two scanning lines and shifted by one scanning line from the first combination in a second unit period, the first unit period and the second unit period being included in a display period in which the right-eye image is displayed and in a display period in which the left-eye image is displayed; and a signal line driving circuit that supplies a gray scale potential corresponding to an image signal of a pixel corresponding to one scanning line of the first combination of the plurality of scanning lines in the first unit period and supplies a gray scale potential corresponding to an image signal of a pixel corresponding to other scanning line of the first combination of the plurality of scanning lines in the second unit period.

With such a configuration, since each pair of two scanning lines is sequentially selected from the scanning lines in the first unit period of each display period and the gray scale potential is supplied to the pixels, the time in which the right-eye image and the left-eye image are merged is shortened, compared to a case where each scanning line is sequentially selected in each display period and a gray scale potential is supplied to the pixels. Accordingly, by controlling both right-eye shutter and left-eye shutter of stereoscopic glasses to a closed state in the merging period of the right-eye image and the left-eye image, the brightness of a display image can be improved, even when a viewer is prevented from perceiving the merging of the right-eye image and the left-eye image. Further, since two scanning lines are selected in each of the first and second unit periods, it is not necessary to increase the transmission speed of an image signal of the right-eye image and the left-eye image and the process speed of a driving circuit (the scanning line driving circuit and the signal line driving circuit) compared to planar (2D) display. Accordingly, it is possible to obtain the advantage of realizing stereoscopic display (that is, reducing the circuit size or the manufacturing cost of the driving circuit) using the driving circuit with the same process speed as a driving circuit used for a planar image. Furthermore, the resolution of the display image deteriorates in each of the first and second unit periods. However, the gray scale potential corresponding to the designated gray scale of the pixels of the first scanning line is supplied to the pixels of the first pair of scanning lines in each selection period of the first unit period. The gray scale potential corresponding to the designated gray scale of the pixels of the second scanning line is supplied to the pixels of the second pair of scanning lines shifted by one scanning line from the first pair of scanning lines in each selection period of the second unit period after the first unit period has elapsed. Accordingly, it is possible to obtain the advantage that it is difficult for the viewer to perceive the deterioration in the resolution of the display image in each unit period.

The electro-optic device according to the aspect of the invention displays the right-eye image and the left-eye image stereoscopically viewed with stereoscopic glasses including right-eye shutter and left-eye shutter. The electro-optic device may further include a glasses control circuit that controls both the right-eye shutter and left-eye shutter to the closed state in a period (which includes at least a part of a first unit period of each display period and also may further include a part of the second unit period) including at least a part of the first unit period of each display period, controls the right-eye shutter and left-eye shutter to the open state and the closed state, respectively, in a period (which includes at least a part of the second unit period and also may further include a part of the first unit period) including at least a part of the second unit period of each display period of the right-eye image, and controls the left-eye shutter and right-eye shutter to the open state and the closed state, respectively, in a period (which includes at least a part of the second unit period and also may further include a part of the first unit period) including at least a part of the second unit period of each display period of the left-eye image.

In the electro-optic device according to the aspect of the invention, in each of a plurality of control periods including the display periods of the right-eye image and the left-eye image occurring in tandem, the scanning line driving circuit sequentially selects the first pair of scanning lines in each selection period of the first unit period of each display period and sequentially selects the second pair of scanning lines in each selection period of the second unit period. The signal line driving circuit supplies each signal line with a gray scale potential corresponding to a designated gray scale of the pixels of the first scanning line of the first pair of scanning lines selected in the corresponding selection period in each selection period of the first unit period of each display period, and supplies each signal line with a gray scale potential corresponding to a designated gray scale of the pixels of the second scanning line of the second pair of scanning lines selected in the corresponding selection period in each selection period of the second unit period in each of the plurality of control periods. The signal line driving circuit sets the polarity of the gray scale potential with respect to the reference voltage to a first polarity in the first unit period of each display period of a first control period among a plurality of control periods, sets the polarity of the gray scale potential to a second polarity reverse to the first polarity in the second unit period of each display period, sets the polarity of the gray scale potential with respect to the reference voltage to a second polarity in the first unit period of each display period in a second control period immediately after the first control period among the plurality of control periods, and sets the polarity of the gray scale potential to the first polarity in the second unit period of each display period. A specific example of the aspect of the invention will be described in detail, for example, in a first embodiment.

In the electro-optic device according to the above aspect of the invention, the gray scale potential is retained to have the same polarity in two unit periods at the boundary of the first and second control periods. Accordingly, the viewer easily perceives flickering caused due to a difference in the polarity of the gray scale potential. Accordingly, in the electro-optic device according to the aspect of the invention, in the first control period of the plurality of control periods including the display periods of the right-eye image and the left-eye image occurring in tandem, the scanning line driving circuit sequentially selects the first pair of scanning lines in each selection period of the first unit period of each display period and sequentially selects the second pair of scanning lines in each selection period of the second unit period of each display period. In the second control period immediately subsequent to the first control period among the plurality of selection periods, the scanning line driving circuit sequentially selects the second pair of scanning lines in each selection period of the first unit period of each display period and sequentially selects the first pair of scanning lines in each selection period of the second unit period of each display period. In the first control period, the signal line driving circuit supplies each signal line with a gray scale potential corresponding to a designated gray scale of the pixels of the first scanning line of the first pair of scanning lines selected in the corresponding selection period in each selection period of the first unit period of each display period and supplies each signal line with a gray scale potential corresponding to a designated gray scale of the pixels of the second scanning line of the second pair of scanning lines selected in the corresponding selection period in each selection period of the second unit period of each display unit. In the second control period, the signal line driving circuit supplies each signal line with a gray scale potential corresponding to a designated gray scale of the pixels of the second scanning line of the second pair of scanning lines selected in the corresponding selection period in each selection period of the first unit period of each display period and supplies each signal line with a gray scale potential corresponding to a designated gray scale of the pixels of the first scanning line of the first pair of scanning lines selected in the corresponding selection period in each selection period of the second unit period of each display unit. In each of the plurality of control periods, the signal line driving circuit sets the polarity of the gray scale potential with respect to the reference voltage to the first polarity in the first unit period of each display period and sets the polarity of the gray scale potential to the second polarity reverse to the first polarity in the second unit period of each display period. In the electro-optic device according to the aspect of the invention, since the polarity of the gray scale potential is reversed in each unit period, it is possible to obtain the advantage that it is difficult for the viewer to perceive flickering caused due to a difference in the polarity of the gray scale potential. Further, the length of time in which the gray scale potential is set to the positive polarity in accordance with the designated gray scale of the right-eye image or the left-eye image is equal to the length of time in which the gray scale potential is set to the negative polarity. Accordingly, it is possible to obtain the advantage of suppressing a direct-current voltage from being applied to the pixels. A specific example of the aspect of the invention will be described in detail, for example, in a third embodiment.

When it is supposed that Z scanning lines which are the arbitrary number of scanning lines are simultaneously selected in the selection period, the electro-optic device according to the aspect of the invention is configured as an electro-optic device that alternately displays the right-eye image and the left-eye image in the display period according to another aspect of the invention. The electro-optic device includes: a plurality of scanning lines and a plurality of signal lines intersecting each other; a plurality of pixels that are arranged to correspond to the intersections of the plurality of scanning lines and the plurality of signal lines; a scanning line driving circuit that, in each display period sequentially selects a first pair of Z (where Z is a natural number equal to or greater than 2) scanning lines adjacent to each other divided from the plurality of scanning lines in each selection period in a first unit period in Z unit periods during the corresponding display period and sequentially selects a z-th pair of Z scanning lines adjacent to each other divided from the plurality of scanning lines and shifted by (z-1) scanning lines from the first pair of Z scanning lines in a z-th unit period (where $2 \leq z \leq Z$) during the corresponding display period; and a signal line driving circuit that, in each display period, supplies each signal line with a gray scale potential corresponding to a designated gray scale of the pixels of a first scanning line in the first pair of Z scanning lines selected in the corresponding selection period in each selection period of the first unit period of the corresponding display period and supplies each signal line with a gray scale potential corresponding to a designated gray scale of the pixels of a z-th scanning line in the z-th pair of Z scanning lines selected in the corresponding selection period in each selection period of the z-th unit period of the corresponding display period.

For example, when three scanning lines are selected in the selection period (where Z=3), the scanning line driving circuit sequentially selects a first pair of three scanning lines adjacent to each other divided from the plurality of scanning lines in each selection period of the first unit period among the first to third unit periods included in each display period, sequentially selects the second pair of three scanning lines adjacent to each other divided from the plurality of scanning lines and shifted by one scanning line from the first pair of scanning lines in each selection period of the second unit period after the first unit period has elapsed, and sequentially selects the third pair of three adjacent scanning lines divided from the plurality of scanning lines and shifted by two scanning lines from the first pair of scanning lines in each selection period of the third unit period after the second unit period has elapsed. In each display period, the signal line driving circuit supplies each signal line with a gray scale potential corresponding to a designated gray scale of the pixels of the first scanning line in the first pair of scanning lines selected in the corresponding selection period in each selection period of the first unit period, supplies each signal line with a gray scale potential corresponding to a designated gray scale of the pixels of the second scanning line different from the first scanning line in the second pair of scanning lines selected in the corresponding selection period in each selection period of the second unit period, and supplies each signal line with a gray scale potential corresponding to a designated gray scale of the pixels of the third scanning line different from the first and second scanning lines in the third pair of scanning lines selected in the corresponding selection period in each selection period of the third unit period. In the electro-optic device according to the aspect of the invention, by controlling the right-eye shutter to the open state in the second and third unit periods of the display period of the right-eye image and controlling the left-eye shutter to the open state in the second and third unit periods of the display period of the left-eye image, it is possible to improve the brightness of the display image. In a specific example of this configuration, the signal line driving circuit sets the polarity of the gray scale potential with respect to the reference potential to the same polarity between two unit periods occurring in tandem and reverses the polarity of the gray scale potential in a unit of two unit periods. A specific example of the electro-optic device according to the aspect of the invention will be described in detail, for example, in a fourth embodiment.

The electro-optic device according to the aspect of the invention is utilized as a display member in various electronic apparatuses. For example, a stereoscopic display apparatus including the electro-optic device according to the aspects of the invention and stereoscopic glasses controlled by the glasses control circuit is exemplified as an electronic apparatus according to another aspect of the invention.

BRIEF DESCRIPTION OF THE DRAWINGS

The invention will be described with reference to the accompanying drawings, wherein like numbers reference like elements.

FIG. 12 is a diagram illustrating a stereoscopic viewing process of a technique according to the related art.

DESCRIPTION OF EXEMPLARY EMBODIMENTS

First Embodiment

Figure 1:
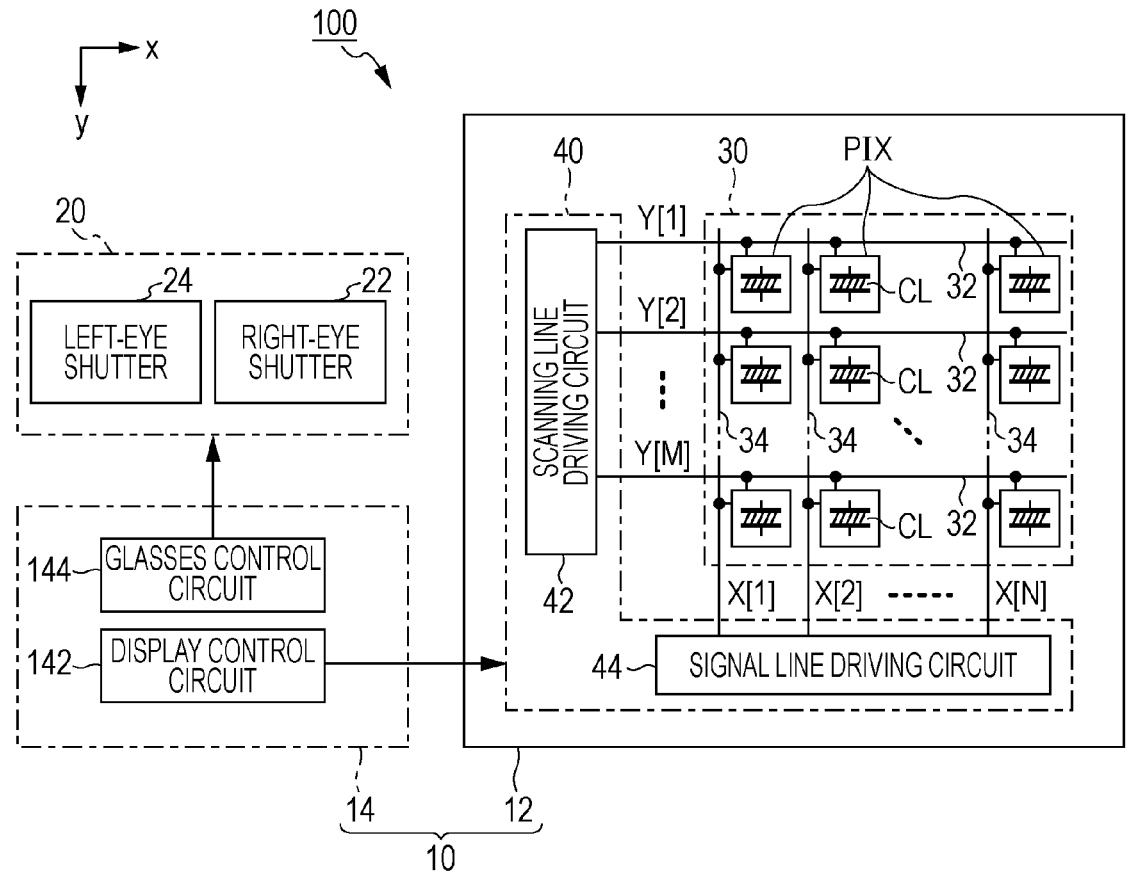
FIG. 1 is a block diagram illustrating a stereoscopic display apparatus according to a first embodiment of the invention.

FIG. 1 is a block diagram illustrating a stereoscopic display apparatus 100 according to a first embodiment of the invention. The stereoscopic display apparatus 100 is an electronic apparatus that displays a stereoscopic image, for which a viewer perceives a stereoscopic effect, in an active shutter mode. The stereoscopic display apparatus 100 includes an electro-optic device 10 and stereoscopic glasses 20. The electro-optic device 10 alternately displays a right-eye image GR and a left-eye image GL with a mutual parallax effect in a time-division manner.

The stereoscopic glasses 20 are a glasses-type instrument which a viewer wears when viewing a stereoscopic image displayed by the electro-optic device 10. The stereoscopic glasses 20 includes a right-eye shutter 22 located on the front side of the right eye of the viewer and a left-eye shutter 24 located on the front side of the left eye of the viewer. The right-eye shutter 22 and the left-eye shutter 24 are each controlled to an open state (light-transmission state) where irradiated light is transmitted and a closed state (light-blocking state) where irradiated light is blocked. For example, a liquid crystal shutter changed from one of the open state and the closed state to the other thereof by changing the alignment direction of liquid crystal in accordance with an applied voltage can be utilized as the right-eye shutter 22 and the left-eye shutter 24.

The electro-optic device 10 in FIG. 1 includes an electro-optic panel 12 and a control circuit 14. The electro-optic panel 12 includes a pixel section 30 in which a plurality of pixels (pixel circuits) PIX are arranged and a driving circuit 40 driving the pixels PIX. M scanning lines 32 extending in the x direction and N signal lines 34 extending in the y direction intersecting the x direction are formed in the pixel section 30 (where M and N are natural numbers). In the pixel section 30, the plurality of pixels PIX are arranged in a matrix form of vertical M rows by horizontal N columns so as to correspond to the intersections of the scanning lines 32 and the signal lines 34.

The driving circuit 40 includes a scanning line driving circuit 42 and a signal line driving circuit 44. The scanning line driving circuit 42 sequentially selects the scanning lines 32 when scanning signals Y[1] to Y[M] corresponding to the scanning lines 32, respectively, are supplied. When the scanning signals Y[m] (where m=1 to M) are set with a predetermined selection potential, an m-th scanning line 32 is selected. The signal line driving circuit 44 supplies gray scale potentials X [1] to X [N] to the N signal lines 34, respectively, in synchronization with the selection of the scanning lines 32 by the scanning line driving circuit 42. The gray scale potential X [n] (where n=1 to N) is set to be variable in accordance with the gray scale (hereinafter, referred to as a "designation gray scale") used for designating an image signal supplied from an outside circuit to each pixel PIX. The polarity of the gray scale potential X [n] with respect to a predetermined reference potential is reversed periodically.

Figure 2:
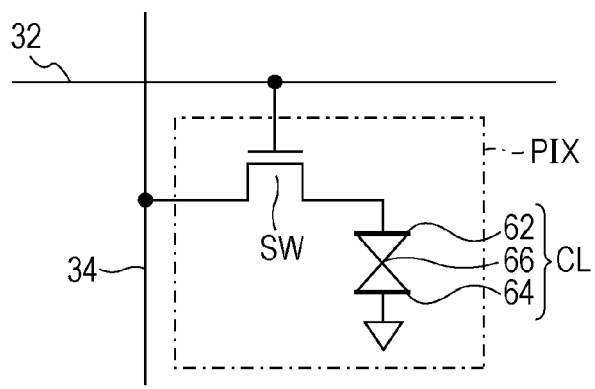
FIG. 2 is a circuit diagram illustrating a pixel circuit.

FIG. 2 is a circuit diagram illustrating each pixel PIX. As shown in FIG. 2, each pixel PIX includes a liquid crystal element CL and a select switch SW. The liquid crystal element CL is an electro-optic element that includes a pixel electrode 62, a common electrode 64 facing the pixel electrode 62, and liquid crystal 66 interposed between both electrodes. The transmittance (display gray scale) of the liquid crystal 66 is changed in accordance with a voltage applied between the pixel electrode 62 and the common electrode 64. The select switch SW is configured by an N-channel thin film transistor with a gate connected to the scanning line 32. The select switch SW is interposed between the liquid crystal element CL and the signal line 34 and controls electric connection (conduction/insulation) therebetween. When the scanning signal Y[m] is set to a select potential, the select switches SW in the pixels PIX of the m-th row are simultaneously transitioned to an ON state. When the select switch SW is controlled to the ON state (that is, when the scanning line 32 is selected), each pixel PIX (the liquid crystal element CL) displays the gray scale corresponding to the gray scale potential X [n] of the signal line 34. An auxiliary capacitor may be connected in parallel to the liquid crystal element CL.

The control circuit 14 in FIG. 1 includes a display control circuit 142 that controls the electro-optic panel 12 and a glasses control circuit 144 that controls the stereoscopic glasses 20. The display control circuit 142 and the glasses control circuit 144 may be mounted integrally on a single integrated circuit. Alternatively, the display control circuit 142 and the glasses control circuit 144 may be mounted separately on separate integrated circuits. The display control circuit 142 controls the driving circuit 40 such that the driving circuit 40 displays the right-eye image GR and the left-eye image GL having a mutual parallax effect in a time-division manner on the pixel section 30. Specifically, the display control circuit 142 controls the driving circuit 40 such that the driving circuit 40 performs a process described below.

Figure 3:
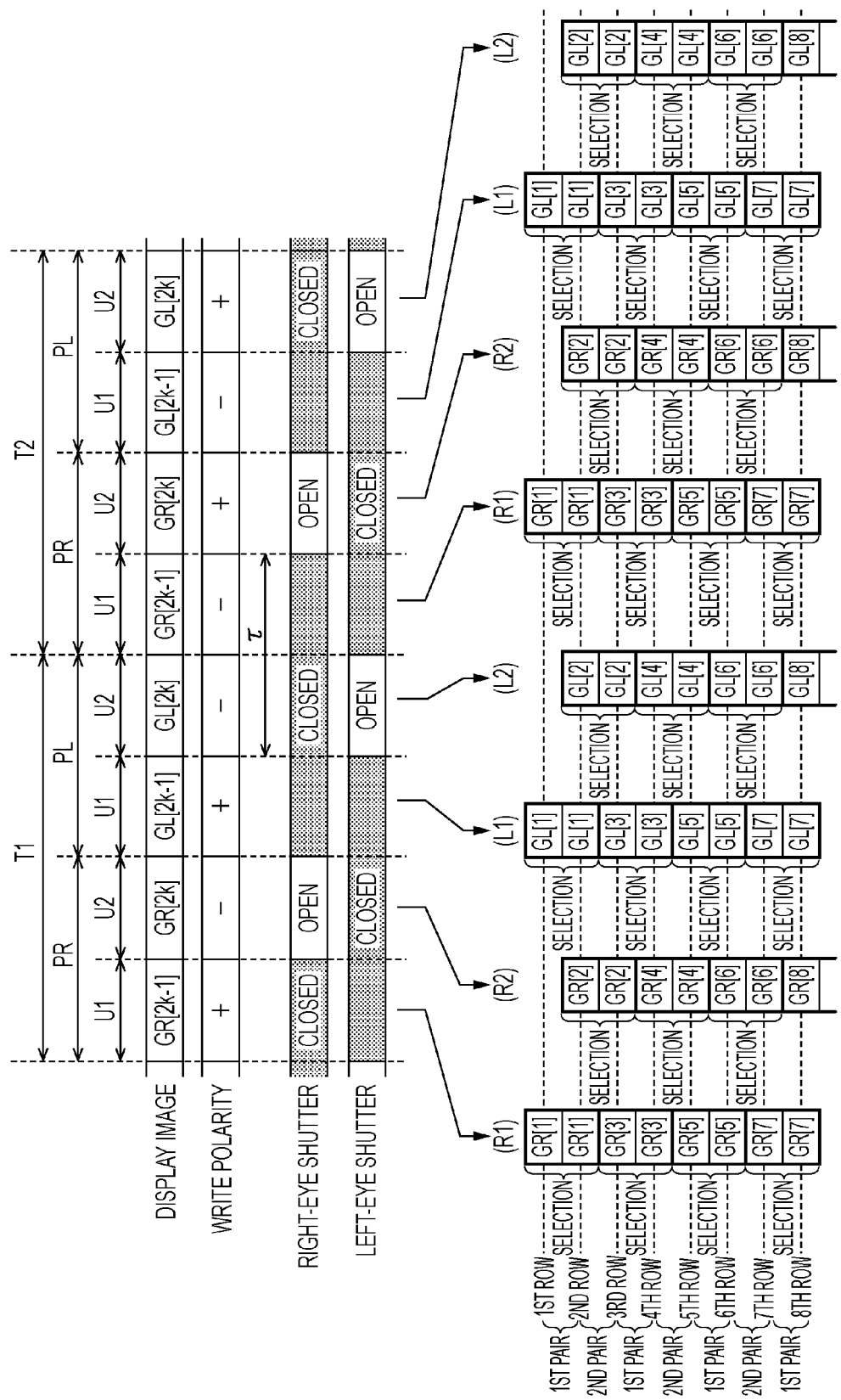
FIG. 3 is a diagram illustrating a process of the stereoscopic display apparatus.

FIG. 3 is a diagram illustrating the process of the electro-optic device 10. A process period of the electro-optic device 10 is divided into a plurality of control periods T (T1 and T2). The control periods T1 and T2 are arranged on a time axis. Each of the control periods T (T1 and T2) is divided into two display periods P (a right-eye display period PR and a left-eye display period PL) with a predetermined length. In the right-eye display period PR, the right-eye image GR is displayed on the pixel section 30. In the left-eye display period PL, the left-eye image GL is displayed on the display section 30. The right-eye display period PR and the left-eye display period PL are arranged on a time axis. That is, two display periods P (a pair of right-eye display period PR and left-eye display period PL) which occur in tandem form one control period T (T1 or T2). Each of the display periods P (PR and PL) is divided into two unit periods U (U1 and U2). The unit period U2 is subsequent to the unit period U1.

Figure 4:
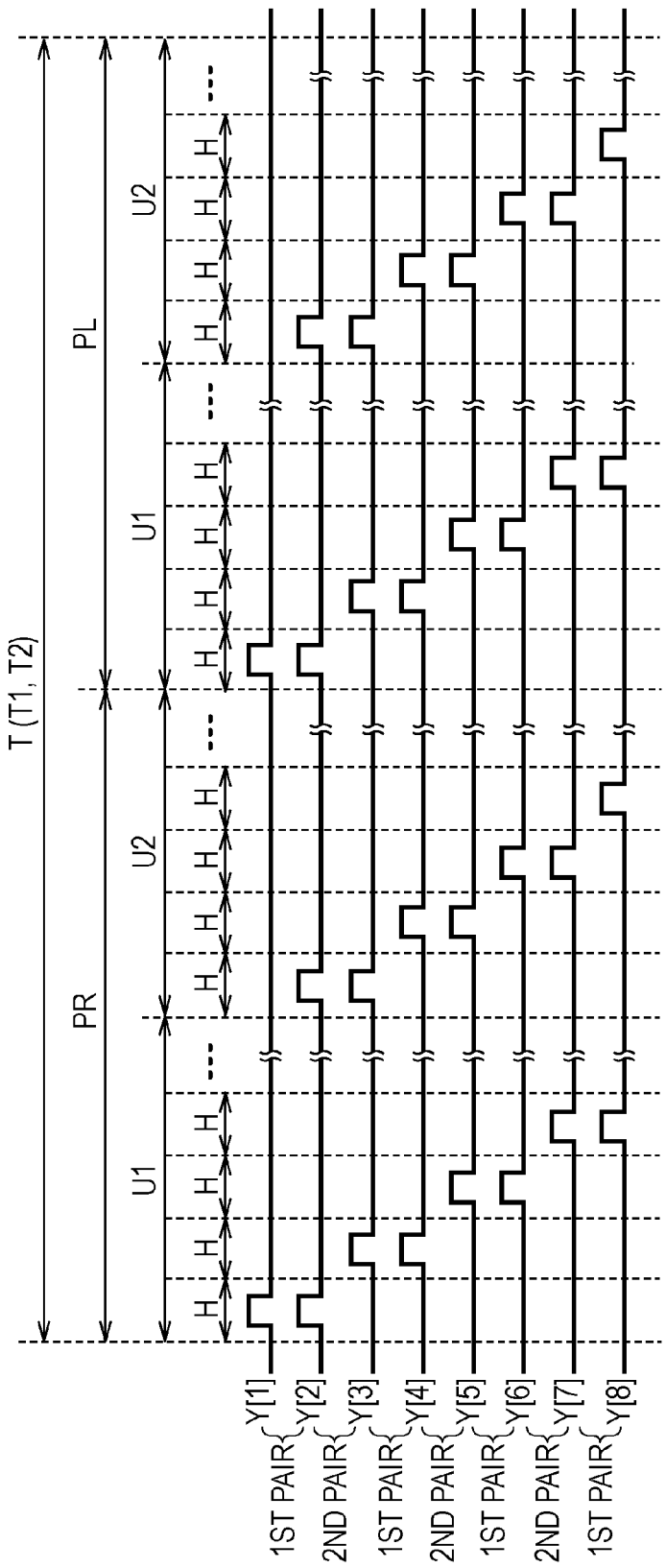
FIG. 4 is a diagram illustrating a process of a scanning line driving circuit.

FIG. 4 is a diagram illustrating a process of the scanning line driving circuit 42 in the display periods P (PR and PL). In the unit period U1 of each display period P, as shown in FIG. 4, the scanning line driving circuit 42 sequentially selects each of plural pairs (hereinafter, referred to as "first pairs") of scanning lines, which are two adjacent scanning lines divided from the M scanning lines 32, in each selection period H. The first pair of scanning lines includes one scanning line 32 of an even row (2k-th row) and one scanning line 32 of an odd row ((2k−1)-th row) adjacent to the one scanning line 32 on the negative side of the y direction (where k is a natural number). The scanning line driving circuit 42 simultaneously selects the first pair of two scanning lines 32 by setting the scanning signals Y[2k−1] and Y[2k] so as to have a selection potential in one selection period H of the unit period U1. For example, the scanning line driving circuit 42 simultaneously selects two scanning lines 32 of the first and second rows in the first selection period H of the unit period U1, and then simultaneously selects two scanning lines 32 of the third and fourth rows in the second selection period H of the unit period U1.

In the unit period U2 of each display period P, the scanning line driving circuit 42 sequentially selects each of plural pairs (hereinafter, referred to as "second pairs") of scanning lines, which are two adjacent scanning lines divided from the M scanning lines 32 in a combination different from the first pair of scanning lines, in each selection period H. The second pair of scanning lines includes one scanning line 32 of an even row (2k-th row) and one scanning line 32 of an odd row ((2k+1)-th row) adjacent to the one scanning line 32 on the positive side of the y direction. That is, the first and second pairs of scanning lines have a relation in which the first pair of scanning lines is shifted by one scanning line in the y direction from the second pair of scanning lines 32. The scanning line driving circuit 42 simultaneously selects the second pair of two scanning lines 32 by setting the scanning signals Y[2k] and Y[2k+1] so as to have a selection potential in one selection period H of the unit period U2. For example, the scanning line driving circuit 42 simultaneously selects two scanning lines 32 of the second and third rows in the first selection period H of the unit period U2, and then simultaneously selects two scanning lines 32 of the fourth and fifth rows in the second selection period H of the unit period U2. Further, to facilitate the description of the first embodiment, the case has hitherto been described in which the scanning lines 32 of the first and M-th rows are not selected in the unit period U2. However, the scanning lines 32 of the first and M-th rows may be also selected in the unit period U2.

The signal line driving circuit 44 sequentially supplies the signal lines 34 with the gray scale potentials X [1] to X [N] corresponding to the image signal of the right-eye image GR in the selection periods H of the right-eye display period PR, respectively, and sequentially supplies the signal lines 34 with the gray scale potentials X [1] to X [N] corresponding to the image signal of the left-eye image GL in the selection periods H of the left-eye display period PL, respectively. FIG. 3 shows a temporal variation in the polarity (write polarity) of each gray scale potential X [n] with respect to a predetermined reference potential (for example, the potential of the common electrode 64). Since the gray scale potential X [n] is supplied to the pixel electrode 62 of the liquid crystal element CL, the polarities exemplified in FIG. 3 can be identical with the polarities of the voltage applied to the liquid crystal element CL.

As shown in FIG. 3, the signal line driving circuit 44 reverses the polarity of the gray scale potential X [n] in each unit period U (U1 and U2) of each control period T and sets the polarity of the gray scale potential X [n] to be reversed between the unit periods U of the control periods T which occur in tandem. Specifically, in the control period T1, the gray scale X [n] is set to have a positive polarity (+) in the unit period U1 of each display period P (PR and PL) and is set to have a negative polarity (−) in the unit period U2 of each display period P. On the other hand, in the control period T2 immediately after the control period T1, the gray scale X [n] is set to have a negative polarity (−) in the unit period U1 of each display period P (PR and PL) and is set to have a positive polarity (+) in the unit period U2 of each display period P.

A relation between a designated gray scale defined by an image signal and the gray scale potential X [n] in each selection period H will be described in detail below. In the selection period H in which two scanning lines 32 of the (2k−1)-th and 2k-th rows forming the first pair of scanning lines are selected in the unit period U1 of the right-eye display period PR of each control period T (T1 and T2), the signal line driving circuit 44 supplies each signal line 34 with the gray scale potential X [n] corresponding to a designated gray scale GR [2k−1] of the pixels PIX of the (2k−1)-th row in the right-eye image GR. Accordingly, as shown in a portion (R1) of FIG. 3, the gray scale potential X [n] corresponding to the designated gray scale GR [2k−1] of the pixels PIX of the (2k−1)-th row is commonly supplied to the pixels PIX of the (2k−1)-th and 2k-th rows forming the first pair of scanning lines. For example, in the first selection period H of the unit period U1, the gray scale potential X [n] corresponding to the designated gray scale GR [1] of the pixels PIX of the first row in the right-eye image GR is supplied to the pixels PIX of the first and second rows. In the second selection period H, the gray scale potential X [n] corresponding to the designated gray scale GR [3] of the pixels PIX of the third row in the right-eye image GR is supplied to the pixels PIX of the third and fourth rows. In this way, the common gray scale potential X [n] is supplied to two pixels PIX adjacent to each other in the y direction in the unit period U1. Therefore, when the unit period U1 of the right-eye display period PR ends, the right-eye image GR of which the resolution in the y direction is halved is displayed on the pixel section 30.

In the unit period U2 of the right-eye display period PR of each control period T (T1 and T2), the signal line driving circuit 44 supplies each signal line 34 with the gray scale potential X [n] corresponding to a designated gray scale GR [2k] of the pixels PIX in the 2k-th scanning line 32 in the right-eye image GR in the selection period H in which two scanning lines 32 of the 2k-th and (2k+1)-th rows forming the second pair of scanning lines are selected. Accordingly, as shown in a portion (R2) of FIG. 3, the gray scale potential X [n] corresponding to the designated gray scale GR [2k] of the pixels PIX of the 2k-th row is commonly supplied to the pixels PIX of the 2k-th and (2k+1)-th rows forming the second pair of scanning lines. For example, in the first selection period H of the unit period U2, the gray scale potential X [n] corresponding to the designated gray scale GR [2] of the pixels PIX of the second row in the right-eye image GR is supplied to the pixels PIX of the second and third rows. In the second selection period H, the gray scale potential X [n] corresponding to the designated gray scale GR [4] of the pixels PIX of the fourth row in the right-eye image GR is supplied to the pixels PIX of the fourth and fifth rows. Further, in the configuration in which the scanning lines of the first and M-th rows are selected in the unit period U2, for example, the gray scale potential X [n] which is a predetermined potential (for example, a potential corresponding to the intermediate level) is supplied to the signal lines 34 in the selection period H in which the scanning lines of the first and M-th rows are selected. In this way, in the unit period U2, the common gray scale potential X [n] is supplied to two pixels PIX adjacent to each other in the y direction. Therefore, when the unit period U2 of the right-eye display period PR ends, the right-eye image GR of which the resolution in the y direction is halved is displayed on the pixel section 30.

In the left-eye display period PL of each control period T (T1 and T2), the same process as that in the right-eye display period PR is performed. That is, in each selection period H of the unit period U1 of the left-eye display period PL, as shown in a portion (L1) of FIG. 3, the gray scale potential X [n] corresponding to a designated gray scale GL [2k−1] of the pixels PIX of the (2k−1)-th row is supplied to the pixels PIX of the first pair of scanning lines formed by the (2k−1)-th and 2k-th rows. Further, in each selection period H of the unit period U2 of the left-eye display period PL, as shown in a portion (L2) of FIG. 3, the gray scale potential X [n] corresponding to a designated gray scale GL [2k] of the pixels PIX of the 2k-th row is supplied to the pixels PIX of the second pair of scanning lines formed by the 2k-th and (2k+1)-th rows.

As understood from the above description, in the unit period U1 of the right-eye display period PR, the left-eye image GL displayed in the immediately previous left-eye display period PL is updated to the left-eye image GR in order in each first pair of scanning lines (every two lines). In the unit period U1 of the left-eye display period PL, the right-eye image GR displayed in the immediately previous right-eye display period PR is updated to the left-eye display image GL in order in each first pair of scanning lines. That is, in the unit period U1 of each display period P, the right-eye image GR and the left-eye image GL are merged.

The glasses control circuit 144 of the control circuit 14 in FIG. 1 controls the states (the open state and the closed state) of the right-eye shutter 22 and the left-eye shutter 24 of the stereoscopic glasses 20 in synchronization with the process of the electro-optic panel 12. Specifically, the glasses control circuit 144 controls both the right-eye shutter 22 and the left-eye shutter 24 to the closed state in the unit period U1 of each display period P (PR and PL), as shown in FIG. 3. Further, the glasses control circuit 144 controls the right-eye shutter 22 and the left-eye shutter 24 to the open state and the closed state, respectively, in the unit period U2 of the right-eye display period PR and controls the left-eye shutter 24 and the right-eye shutter 22 to the open state and the closed state, respectively, in the unit period U2 of the left-eye display period PL.

Accordingly, the right-eye image GR displayed in the unit period U2 of the right-eye display period PR is transmitted through the right-eye shutter 22 and reaches the right eye of a viewer, and the right-eye image GR is blocked by the left-eye shutter 24. On the other hand, the left-eye image GL displayed in the unit period U2 of the left-eye display period PL is transmitted through the left-eye shutter 24 and reaches the left eye of the viewer, and the left-eye image GL is blocked by the right-eye shutter 22. Thus, the viewer can perceive the stereoscopic effect of the display image, since the viewer views the right-eye image GR transmitted through the right-eye shutter 22 with his or her right eye and views the left-eye image GL transmitted through the left-eye shutter 24 with his or her left eye.

As described above, the right-eye image GR and the left-eye image GL are merged in the unit period U1 of each display period P. As described above with reference to FIG. 3, however, both the right-eye shutter 22 and the left-eye shutter 24 are in the closed state in the unit period U1 of each display period P. Therefore, the merging (crosstalk) of the right-eye image GR and the left-eye image GL is not perceived by the viewer. That is, since the right-eye image GR and the left-eye image GL are reliably separated to the right and left eyes, respectively, the viewer can perceive a clear stereoscopic effect.

In the above-described first embodiment, the scanning lines 32 are selected in the unit of two lines in the unit period U1 and the gray scale potentials X [n] are supplied to the pixels PIX. Accordingly, the length of time of the merging period (that is, a period in which both the right-eye shutter 22 and the left-eye shutter 24 are retained in the closed state) of the right-eye image GR and the left-eye image GL is shortened, compared to a configuration in which the scanning lines 32 are selected in the unit of one line in order in each selection period H of each display period P and the gray scale potentials X [n] are supplied to the pixels PIX. That is, the length of time can be sufficiently ensured to retain the open state of the right-eye shutter 22 or the left-eye shutter 24 during the display period P. Accordingly, it is possible to improve the brightness of the display image which the viewer perceives.

In the first embodiment, the scanning lines 32 are selected in the unit of two lines in each of the unit periods U1 and U2 of each display period P and the gray scale potential X [n] is supplied to the pixels PIX. Accordingly, it is possible to obtain the advantage of retaining the transmission speed of the image signal or the process speed of the driving circuit 40 equally with the configuration in which the display image is updated at an interval of the display period P.

In each of the unit periods U1 and U2 of each display period P, an image of which the resolution is halved in the y direction of the original display image indicated by the image signal is displayed. However, the image displayed in each first pair of scanning lines in accordance with the designated gray scale GR [2k−1] of an odd row in the unit period U1 of the right-eye display period PR is sequentially updated to the image corresponding to the designated gray scale GR [2k] of an even row by using, as a unit, the second pair of scanning lines which is shifted by one scanning line from the first pair of scanning lines in the unit period U2 immediately after the unit period U1. The same is applied to the left-eye display period PL. Therefore, it is possible to obtain the advantage that it is difficult for the viewer to perceive the deterioration in the resolution of the display image in each unit period U.

Figure 5:
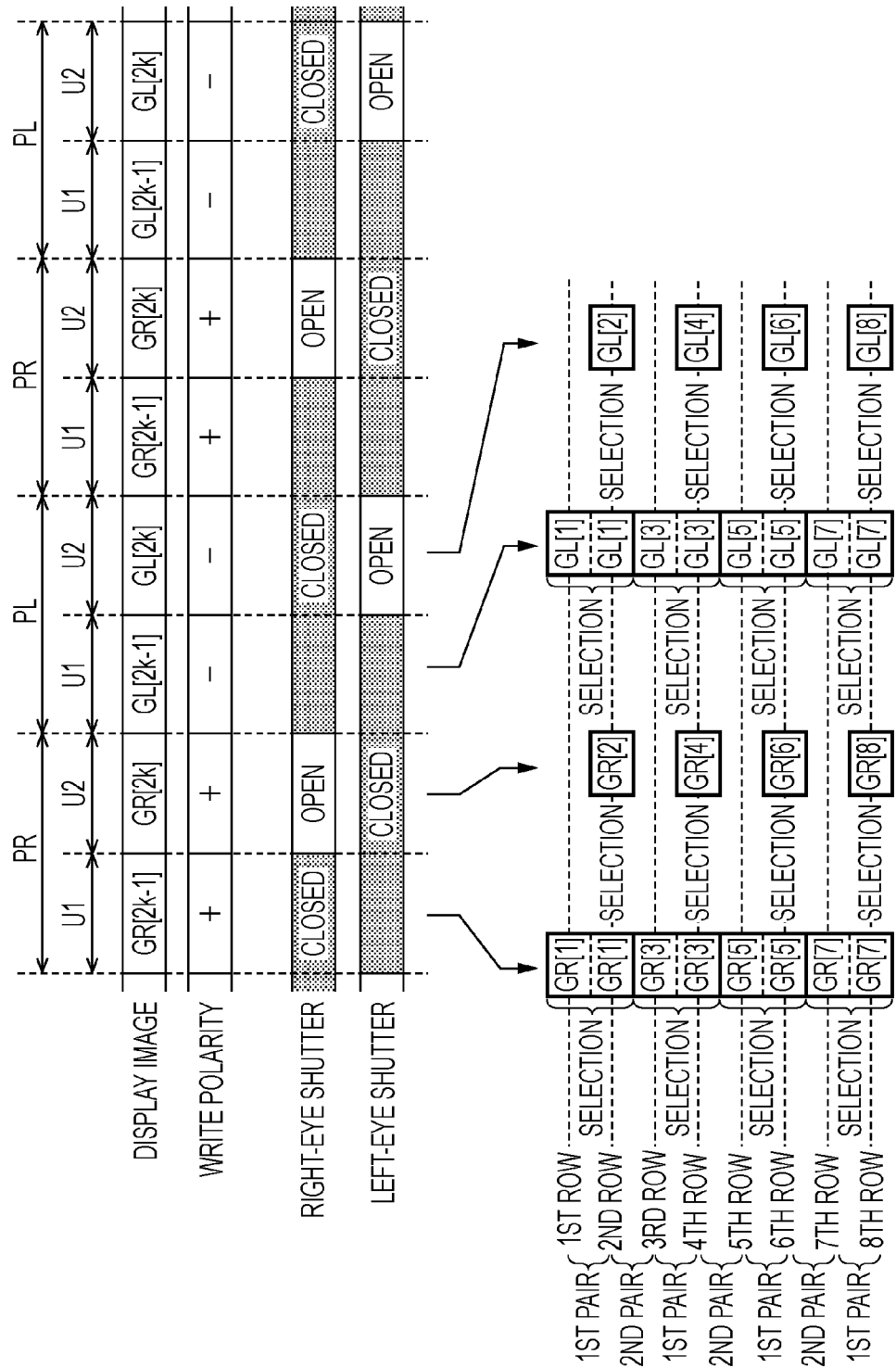
FIG. 5 is a diagram illustrating a process according to a contrasting example.

As shown in FIG. 5, a configuration (hereinafter, referred to as a "contrasting example") may be supposed in which the gray scale potentials X [n] are sequentially supplied to the pixels PIX of the first pair of scanning lines in the unit period U1 of each display period P (PR and PL), as in the first embodiment, and the gray scale potential X [n] corresponding to the designated gray scale GR [2k] of an even row is supplied to the pixels PIX in the unit period U2 of each display period P. That is, in the first selection period H of the unit period U2, the gray scale potential X [n] corresponding to the designated gray scale GR [2] is supplied to the pixels PIX of the second row. In the second selection period H of the unit period U2, the gray scale potential X [n] corresponding to the designated gray scale GR [4] is supplied to the pixels PIX of the fourth row. In the contrasting example, it is possible to obtain the advantage of displaying an image with the original resolution when each unit period U2 ends.

In the configuration according to the contrasting example, when the polarity of the gray scale potential X [n] is reversed between the unit period U1 and the unit period U2 which occur in tandem, the polarity of the voltage applied to the liquid crystal element CL of the pixels PIX is reversed between odd and even rows. Therefore, there is a concern that an alignment failure of the liquid crystal 66 may be caused due to a lateral electronic field between the odd and even rows. In the configuration (for example, the electro-optic device 10 utilized in a projection type display apparatus) in which the pixels PIX are arranged with a high density in the pixel section 30, the above-mentioned tendency is particularly considerable. Accordingly, in the configuration of the contrasting example, as shown in FIG. 5, it is necessary to set the same polarity of the gray scale potential X [n] in the unit periods U1 and U2 which occur in tandem. On the other hand, even when the designated gray scale is common, the voltage (the display gray scale of the pixels PIX) applied to the liquid crystal element CL is different in some cases between a case where the polarity of the gray scale potential X [n] is set to be positive and a case where the polarity of the gray scale potential X [n] is set to be negative. In the configuration in which the polarity of the gray scale potential X [n] is reversed in a long period of two unit periods U, as in the contrasting example, a problem may arise in that the viewer easily perceives a variation (that is, flickering) in the display gray scale caused due to a difference in the polarity of the gray scale potential X [n].

In the first embodiment, the gray scale potential X [n] is supplied to the pixels PIX in the unit of two rows in both unit periods U1 and U2, unlike the contrasting example in which the gray scale potential X [n] is supplied to the pixels PIX at the interval of one row in the unit period U2. Accordingly, as exemplified in FIG. 3, even when the polarity of the gray scale potential X [n] is set to be reversed between the unit periods U1 and U2, the alignment failure of the liquid crystal 66 caused due to the lateral electric field rarely occurs, compared to the contrasting example. That is, in the first embodiment, it is possible to obtain the advantage of reducing the alignment failure of the liquid crystal 66 caused due to the lateral electric field, while suppressing the flickering of the display image by shortening the period of the polarity reversion of the gray scale potential X [n] (reversing the polarity of the gray scale potential in each unit period U).

Second Embodiment

When the polarity of the gray scale potential X [n] in each unit period U is reversed in each control period T, as in the first embodiment, as shown in FIG. 3, the polarity of the voltage applied to the liquid crystal element CL is retained to be same across a length of time τ corresponding to two unit periods U at the boundary of the control periods T. However, as the application period of the voltage with the same polarity to the liquid crystal element CL is longer, it is easily for a viewer to perceive the above-described flickering caused due to a difference in the polarity of the gray scale potential X [n]. In a second embodiment, a solution to this problem occurring in the first embodiment will be described. In the embodiment exemplified below, the same reference numerals are given to the same elements as those of the first embodiment in terms of the operation or the function and the detailed description thereof will not be appropriately repeated.

Figure 6:
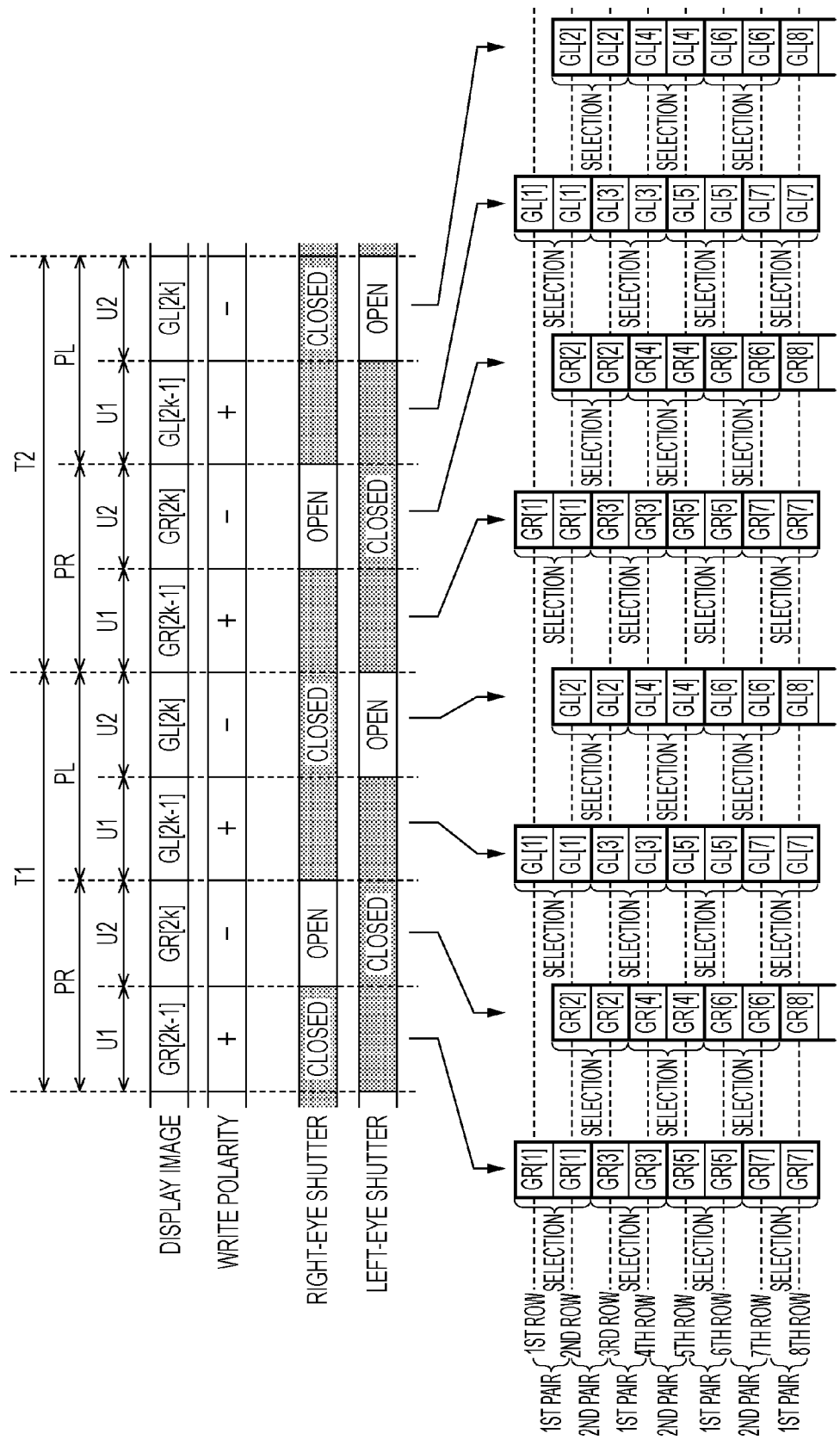
FIG. 6 is a diagram illustrating a process according to a second embodiment.

FIG. 6 is a diagram illustrating a process of the electro-optic device 10 according to the second embodiment. As shown in FIG. 6, the process of selecting the scanning lines 32 in each selection period H by the scanning line driving circuit 42 and the designated gray scale applied to the generation of the gray scale potential X [n] in each selection period H are the same as those of the first embodiment.

As shown in FIG. 6, in both the control periods T1 and T2, the signal line driving circuit 44 sets the polarity of the gray scale potential X [n] to the positive polarity (+) in the unit period U1 of each display period P (PR and PL) and sets the polarity of the gray scale potential X [n] to the negative polarity (−) in the unit period U2 of each display period P. Accordingly, the polarity of the gray scale potential X [n] is normally reversed in each unit period U (U1 and U2), and thus the unit period U in which the polarity of the gray scale potential X [n] is the same does not continue on the time axis. That is, the length of time in which the voltage applied to the liquid crystal element CL is only one unit period U. Accordingly, in the second embodiment, it is possible to obtain the advantage that the viewer rarely perceive flickering caused due to the difference in the polarity of the gray scale potential X [n], compared to the first embodiment, in which the voltage with the same polarity is applied to the liquid crystal element CL across a length of time T corresponding to two unit periods U.

In the second embodiment, however, the gray scale potential X [n] corresponding to the designated gray scale GR [2k−1] of an odd row in the right-eye image GR is normally set to be positive and the gray scale potential X [n] corresponding to the designated gray scale GR [2k] of an even row in the right-eye image GR is normally set to be negative. The designated gray scale of an odd row and the designated gray scale of an even row are normally different from each other in the right-eye image GR. Therefore, in the second embodiment, there is a concern that a bias (residual of a direct-current component) to the polarity of the voltage applied to the liquid crystal element CL occurs. The same is also applied to the left-eye image GL.

On the other hand, in the first embodiment, as understood from FIG. 3, the gray scale potential X [n] corresponding to the designated gray scale GR [2k−1] of an odd row of the right-eye image GR is set to be positive in the unit period U1 of the control period T1 and is set to be negative in the unit period U2 of the control period T2. Likewise, as for the designated gray scale GR [2k−1] of an even row in the right-eye image GR or the designated gray scale GL [2k−1] or the designated gray scale GL [2k] of the left-eye image GL, the length of time in which the gray scale potential X [n] is set to be positive is equal to the length of time in which the gray scale potential X [n] is set to be negative. Accordingly, it is possible to obtain the advantage of reducing the application of the direct-current component to the liquid crystal element CL (suppressing the deterioration of the liquid crystal element CL), compared to the second embodiment.

Third Embodiment

A third embodiment of the invention will be described below. In the third embodiment, the advantage of suppressing the deterioration of the liquid crystal element CL caused due to the application of the direct-current component in the first embodiment can be compatible with the advantage of suppressing the flickering caused due to the difference in the polarity of the gray scale potential X [n] in the second embodiment.

Figure 7:
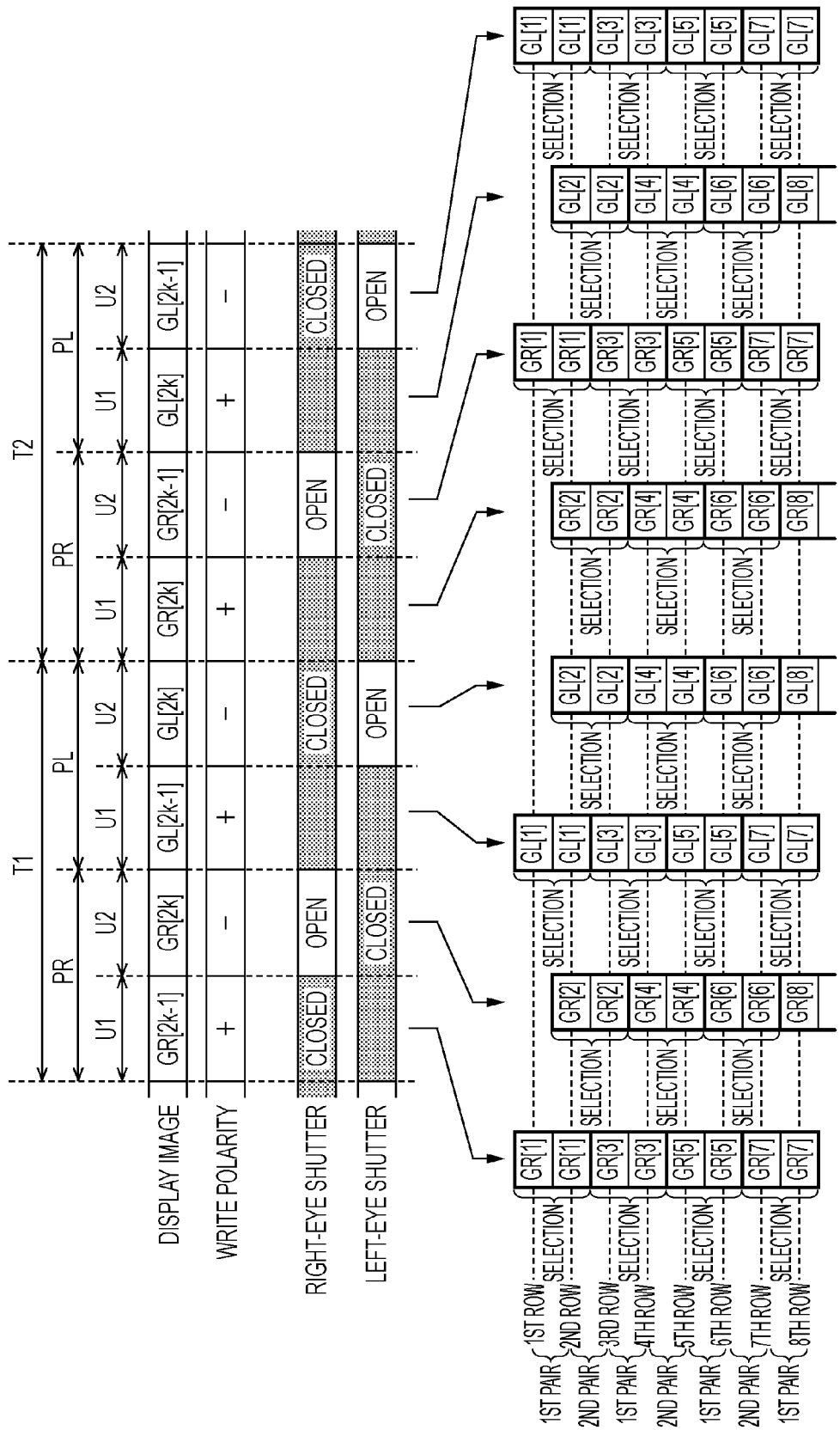
FIG. 7 is a diagram illustrating a process according to a third embodiment.

FIG. 7 is a diagram illustrating a process of the electro-optic device 10 according to the third embodiment. In the third embodiment, in both the control periods T1 and T2, the polarity of the gray scale potential X [n] is set to the positive polarity (+) in the unit period U1 of each display period P and is set to the negative polarity (−) in the unit period U2 of each display period P, as in the second embodiment. Accordingly, as in the second embodiment, it is possible to obtain the advantage that it is difficult for the viewer to perceive the flickering caused due to the difference in the polarity of the gray scale potential X [n].

In the third embodiment, a relation between a selection target (first/second pair) selected by the scanning line driving circuit 42 and the unit period U1/the unit period U2 of each display period P is reversed between the control periods T1 and T2. That is, as shown in FIG. 7, in the control period T1, as in the first embodiment, the scanning line driving circuit 42 sequentially selects the first pair of scanning lines in each selection period H of the unit period U1 of each display period P (PR and PL) and sequentially selects the second pair of scanning lines in each selection period H of the unit period U2 of each display period P. On the other hand, as shown in FIG. 7, in the control period T2, the scanning line driving circuit 42 sequentially selects the second pair of scanning lines in each selection period H of the unit period U1 of each display period P (PR and PL) and sequentially selects the first pair of scanning lines in each selection period H of the unit period U2 of each display period P.

The process of the signal line driving circuit 44 in the control period T1 is the same as that of the first embodiment. That is, as shown in FIG. 7, in the selection period H in which two scanning lines 32 of the (2k−1)-th and 2k-th rows forming the first pair of scanning lines are selected in the unit period U1 of each display period P (PR and PL), the signal line driving circuit 44 supplies each signal line 34 with the gray scale potential X [n] corresponding to the designated gray scale (GR [2k−1] and GL [2k−1]) of the pixels PIX of the (2k−1)-th row. Further, in the selection period H in which two scanning lines 32 of the 2k-th and (2k+1)-th rows forming the second pair of scanning lines are selected in the unit period U2 of each display period P, the signal line driving circuit 44 supplies each signal line 34 with the gray scale potential X [n] corresponding to the designated gray scale (GR [2k] and GL [2k+1]) of the pixels PIX of the 2k-th row.

On the other hand, in each display period P (PR and PL) of the control period T2, the signal line driving circuit 44 supplies each signal line 34 with the gray scale potential X [n] corresponding to the designated gray scale (GR [2k] and GL [2k]) of the pixels PIX of the 2k-th row in the selection period H in which two scanning lines 32 of the 2k-th row and (2k+1)-th row forming the second pair of scanning lines in the unit period U1. Further, in the selection period H in which two scanning lines 32 of the (2k−1)-th and 2k-th rows forming the first pair of scanning lines are selected in the unit period U2 of each display period P, the signal line driving circuit 44 supplies each signal line 34 with the gray scale potential X [n] corresponding to the designated gray scale (GR [2k−1] and GL [2k−1]) of the pixels PIX of the (2k−1)-th row.

That is, the gray scale potential X [n] corresponding to the designated gray scale GR [2k−1] of an odd row in the right-eye image GR is supplied with the positive polarity to the pixels PIX in the unit period U1 of the right-eye display period PR of the control period T1 and is supplied with the negative polarity to the pixels PIX in the unit period U2 of the right-eye display period PR of the control period T2. Likewise, the gray scale potential X [n] corresponding to the designated gray scale GR [2k] of an even row in the right-eye image GR is supplied with the negative polarity to the pixels PIX in the unit period U2 of the right-eye display period PR of the control period T1 and is supplied with the positive polarity to the pixels PIX in the unit period U1 of the right-eye display period PR of the control period T2.

Likewise, the gray scale potential X [n] corresponding to the designated gray scale GL [2k−1] of an odd row of the left-eye image GL or the designated gray scale GR [2k] of an even row is also set to be reversed across the common length of time between the control periods T1 and T2.

In the third embodiment, as described above, the length of time in which the polarity of the gray scale potential X [n] corresponding to the designated gray scale GL [2k−1] of an odd row of the right-eye image GR is set to be positive becomes equal to the length of time in which this polarity of the gray scale potential X [n] is set to be negative. The same is applied to the designated gray scale GR [2k] of an even row of the right-eye image GR, the designated gray scale GL [2k−1] of an odd row of the left-eye image GL, and the designated gray scale GL [2k] of an even row. Accordingly, as in the first embodiment, it is possible to reduce the application of the direct-current component to the liquid crystal element CL compared to the second embodiment. That is, in the third embodiment, the advantage of suppressing the deterioration of the liquid crystal element CL caused due to the application of the direct-current component in the first embodiment can be compatible with the advantage of suppressing the flickering caused due to the difference in the polarity of the gray scale potential X [n] in the second embodiment.

Fourth Embodiment

Figure 8:
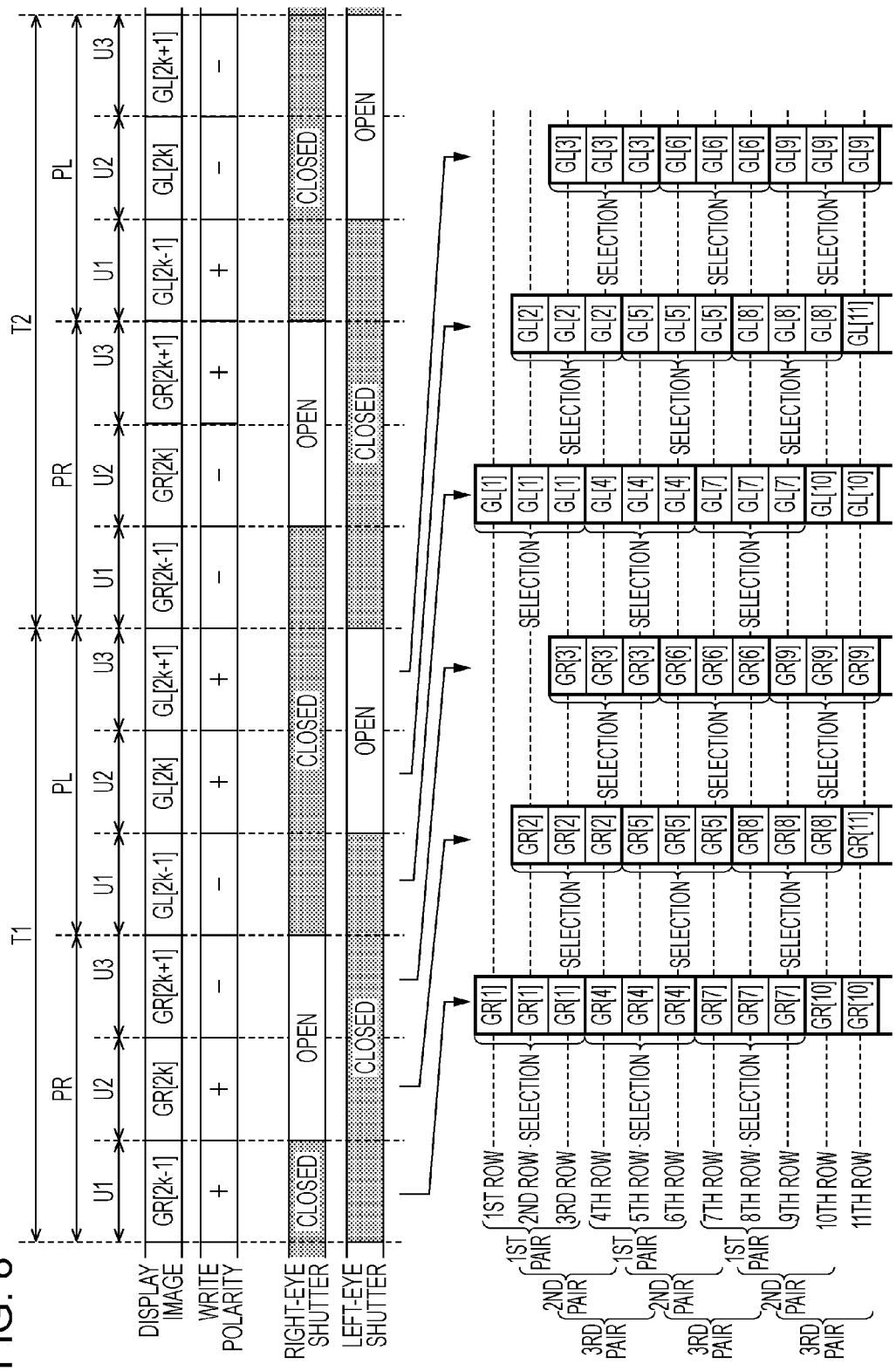
FIG. 8 is a diagram illustrating a process according to a fourth embodiment.

FIG. 8 is a diagram illustrating a process of the electro-optic device 10 according to the fourth embodiment. In the fourth embodiment, as shown in FIG. 8, each display period P (PR and PL) is divided into three unit periods U (U1 to U3).

The scanning line driving circuit 42 sequentially selects three scanning lines 32 adjacent to each other in each selection period of each unit period U. Specifically, in the unit period U1 of each display period P, the scanning line driving circuit 42 sequentially selects each first pair of three scanning lines divided from the M scanning lines 32 in each selection period H. In the unit period U2 after the unit period U1 passes, the scanning line driving circuit 42 sequentially selects each second pair of three scanning lines divided from the M scanning lines 32 and shifted by one scanning line from the first pair of scanning lines in each selection period H. In the unit period U3 after the unit period U2 elapses, the scanning line driving circuit 42 sequentially selects each third pair of three scanning lines divided from the M scanning lines 32 and shifted by one scanning line from the second pair of scanning lines (shifted by two scanning lines from the first pair of scanning lines) in each selection period H. For example, as shown in FIG. 8, each first pair of scanning lines is selected in the order of {the first to third rows}→{the fourth to sixth rows}→{the seventh to ninth rows}→ . . . in the unit period U1, each second pair of scanning lines is selected in the order of {the second to fourth rows}→{the fifth to seventh rows}→{the eighth to tenth rows}→ . . . in the unit period U2, and each third pair of scanning lines is selected in the order of {the third to fifth rows}→{the sixth to eighth rows}→{the ninth to eleventh rows}→ . . . in the unit period U3.

In each selection period H of the unit period U1 of the display period P of each control period T (T1 and T2), the signal line driving circuit 44 supplies each signal line 34 with the gray scale potential X [n] corresponding to the designated gray scale (GR [2k−1] and GL [2k−1]) of the pixels PIX of the scanning lines 32 of the (2k−1)-th row in the first pair of scanning lines selected in the corresponding selection period H. Further, in each selection period H of each unit period U2, the signal line driving circuit 44 supplies each signal line 34 with the gray scale potential X [n] corresponding to the designated gray scale (GR [2k] and GL [2k]) of the pixels PIX of the scanning lines 32 of the 2k-th row in the second pair of scanning lines selected in the corresponding selection period H. In each selection period H of each unit period U3, the signal line driving circuit 44 supplies each signal line 34 with the gray scale potential X [n] corresponding to the designated gray scale (GR [2k+1] and GL [2k+1]) of the pixels PIX of the scanning lines 32 of the (2k+1)-th row in the third pair of scanning lines selected in the corresponding selection period H.

As shown in FIG. 8, in the unit period U1, the gray scale potential X [n] corresponding to the designated gray scale (GR [1] and GL [1]) of the first row is supplied to the pixels PIX of the first to third rows and the gray scale potential X [n] corresponding to the designated gray scale (GR [4] and GL [4]) of the fourth row is supplied to the pixels PIX of the fourth to sixth rows. In the unit period U2, the gray scale potential X [n] corresponding to the designated gray scale (GR [2] and GL [2]) of the second row is supplied to the pixels PIX of the second to fourth rows and the gray scale potential X [n] corresponding to the designated gray scale (GR [5] and GL [5]) of the fifth row is supplied to the pixels PIX of the fifth to seventh rows. Likewise, in the unit period U3, the gray scale potential X [n] corresponding to the designated gray scale (GR [3] and GL [3]) of the third row is supplied to the pixels PIX of the third to fifth rows and the gray scale potential X [n] corresponding to the designated gray scale (GR [6] and GL [6]) of the sixth row is supplied to the pixels PIX of the sixth to eighth rows.

The signal line driving circuit 44 sets the polarity of the gray scale potential X [n] to be the same in two unit periods U occurring in tandem and reverses the polarity of the gray scale potential X [n] to be reverse in a unit of two unit periods U. Specifically, as shown in FIG. 8, the polarity of the gray scale potential X [n] is set to the positive polarity (+) in the unit periods U1 and U2 of the right-eye display period PR, is set to the negative polarity (−) in the unit period U3 of the right-eye display period PR and the unit period U1 of the left-eye display period PL, and is set to the positive polarity (+) in the unit periods U2 and U3 of the left-eye display period PL. The polarity of the gray scale potential X [n] in each unit period U is reversed between the control periods T1 and T2.

On the other hand, the glasses control circuit 144 controls both the right-eye shutter 22 and the left-eye shutter 24 to the closed state in the unit period U1 of each display period P (PR and PL). Further, the glasses control circuit 144 controls the right-eye shutter 22 and the left-eye shutter 24 to the open state and the closed state, respectively, in the unit periods U2 and U3 of the right-eye display period PR and controls the left-eye shutter 24 and the right-eye shutter 22 to the open state and the closed state, respectively, in the unit periods U2 and U3 of the left-eye display period PL.

Even in the fourth embodiment described above, the same advantages as those of the first embodiment are obtained. In the fourth embodiment, one of the right-eye shutter 22 and the left-eye shutter 24 is controlled to the open state in the unit periods U2 and U3 of each display period P. Accordingly, it is possible to improve the brightness of the display image which the viewer perceives, compared to the first embodiment in which the right-eye shutter 22 or the left-eye shutter 24 is controlled to the open state in the unit period U2 of each display period P. Further, the length of time of each unit period U is shortened compared to the first embodiment. Therefore, even when the polarity of the gray scale potential X [n] is reversed at an interval of two unit periods U, it is possible to obtain the advantage that it is difficult for the viewer to perceive the flickering caused due to the difference in the polarity of the gray scale potential X [n].

As understood from the description of each embodiment, when the number of scanning lines 32 simultaneously selected in the selection period H is generalized to a natural number Z equal to or greater than 2, the scanning line driving circuit 42 according to the first to fourth embodiments sequentially selects the first pair of Z scanning lines adjacent to each other and divided from the M scanning lines 32 in each selection period H of the first unit period U1 among Z unit periods U (U1 to UZ) of each display period P (PR and PL) and sequentially selects a z-th pair of Z adjacent scanning lines divided from the M scanning lines 32 and shifted by (z−1) lines from the first pair of scanning lines in each selection period H in a z-th unit period Uz (where 2≤z≤Z) of the display period P.

When the M scanning lines 32 are divided into the first to z-th pairs of first to Z-th scanning lines 32, the signal line driving circuit 44 supplies each signal line 34 with the gray scale potential X [n] corresponding to the designated gray scale of the pixels PIX of the first scanning line 32 in the first pair of scanning lines selected in the corresponding selection period H in each selection period H of the unit period U1 of each display period P (PR and PL) and sequentially supplies with each signal line 34 with the gray scale potential X [n] corresponding to the designated gray scale of the pixels PIX of the z-th scanning line 32 in the z-th pair of scanning lines selected in the corresponding selection period H in each selection period H of the unit period Uz of each display period P. Further, the number of Z scanning lines 32 simultaneously selected may be set to be four or more.

MODIFIED EXAMPLES

Each embodiment described above may be modified in various forms. Specific modified examples will be described below. Two or more modified examples arbitrarily selected from the modified examples described below may be appropriately combined with consistency within the scope of the invention.

(1) In the first to third embodiments, the gray scale potential X [n] corresponding to the designated gray scales (GR [2k−1] and GL [2k−1]) of an odd row is supplied to each signal line 34 in the unit period U1 of each display period P, and the gray scale potential X [n] corresponding to the designated gray scales (GL [2k] and GL [2k]) of an even row is supplied to each signal line 34 in the unit period U2 of each display period P. However, the relation between the unit period U1/the unit period U2 and the odd and even rows of the designated gray scales may be reversed. That is, in the selection period H in which the scanning lines 32 of the (2k−1)-th and 2k-th rows forming the first pair of scanning lines are selected in the unit period U1 of each display period P, the gray scale potential X [n] corresponding to the designated gray scale of the pixels PIX of the 2k-th row may be supplied to each signal line 34. In the selection period H in which the scanning lines 32 of the 2k-th and (2k+1)-th rows forming the second pair of scanning lines are selected, in the unit period U2, the gray scale potential X [n] corresponding to the designated gray scale of the pixels of the (2k+1)-th row may be supplied to each signal line 34.

(2) In the first to third embodiments described above, the right-eye shutter 22 is changed from the closed state to the open state at the end point of the unit period U1 in the right-eye display period PR. However, the right-eye shutter 22 may be changed from the closed state to the open state appropriately at any time. For example, in the configuration in which the right-eye shutter 22 is changed to the open state before the end point of the unit period U1 of the right-eye display period PR, the viewer slightly perceives the merging of the right-eye image GR and the left-eye image GL in the unit period U1. However, it is possible to improve the brightness of the display image. On the contrary, in the configuration in which the right-eye shutter 22 is changed to the open state at the time point after the end point of the unit period U1 of the right-eye display period PR, the brightness of the display image deteriorates. However, it is possible to reliably prevent the viewer from perceiving the merging of the right-eye image GR and the left-eye image GL. Likewise, the time in which the right-eye shutter 22 is changed from the open state to the closed state may be set before the end point of the unit period U2 of the right-eye display period PR (the brightness of the display image deteriorates, but the merging of the right-eye image GR and the left-eye image GL is prevented). Alternatively, the time in which the right-eye shutter 22 is changed from the open state to the closed state may be set after the end point of the unit period U2 of the right-eye display period PR (the merging of the right-eye image GR and the left-eye image GL is slightly perceived in the unit period U1 of the left-eye display period PL, but the brightness of the display image is improved). The open and closed times in which it is difficult for the viewer to perceive the merging of the right-eye image GR and the left-eye image GL also depend on the relation between the response characteristics of the right-eye shutter 22 and the left-eye shutter 24 and the response characteristics of the electro-optic panel 12 (the liquid crystal element CL). Accordingly, the time in which the right-eye shutter 22 is changed from the closed state to the open state or the time in which the right-eye shutter 22 is changed from the open state to the closed state is selected in consideration of a priority (balance) between the factor in which the viewer is prevented from perceiving the merging of the right-eye image GR and the left-eye image GL and the factor in which the brightness of the display image is ensured or various factors such as the relation between the response characteristics of the stereoscopic glasses 20 and the response characteristics of the electro-optic panel 12. The right-eye shutter 22 has hitherto been described, but the same is applied to the left-eye shutter 24.

As understood from the above description, the period in which the right-eye shutter 22 is controlled to the open state is included as a period (irrespective of whether the unit period U1 is included) including at least a part of the unit period U2 of the right-eye display period PR. Likewise, the period in which the left-eye shutter 24 is controlled to the open state is included as a period (irrespective of whether the unit period U1 is included) including at least a part of the unit period U2 of the left-eye display period PL. Further, the time in which both the right-eye shutter 22 and the left-eye shutter 24 are controlled to the closed state is included as a period of a part of the unit period U1 of each display period P (PR and PL).

As exemplified in the first to third embodiments, the opening and closing times of the right-eye shutter 22 and the left-eye shutter 24 are also appropriately changed even in the fourth embodiment. For example, the time at which the state of the right-eye shutter 22 or the left-eye shutter 24 is changed from the closed state to the open state may be set before and after the end point of the unit period U1. The time in which the state of the right-eye shutter 22 or the left-eye shutter 24 is changed from the open state to the closed state may be set before and after the end point (the start point of the unit period U1) of the unit period U3.

(3) The electro-optic element is not limited to the liquid crystal element CL. For example, an electrophoretic element may be used as the electro-optic element. That is, the electro-optic element is included as a display element in which optical characteristics (for example, a transmittance) varies depending on an electric operation (for example, application of a voltage).

APPLICATION EXAMPLES

Figure 9:
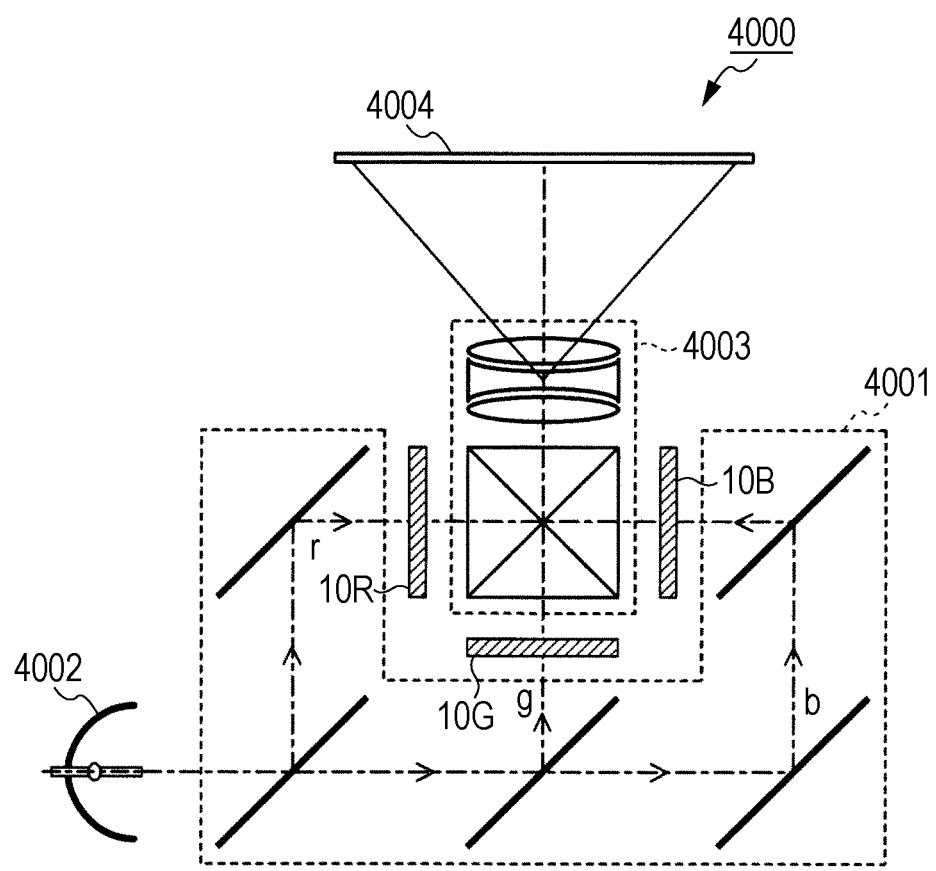
FIG. 9 is a perspective view illustrating an electronic apparatus (projection type display apparatus).
Figure 10:
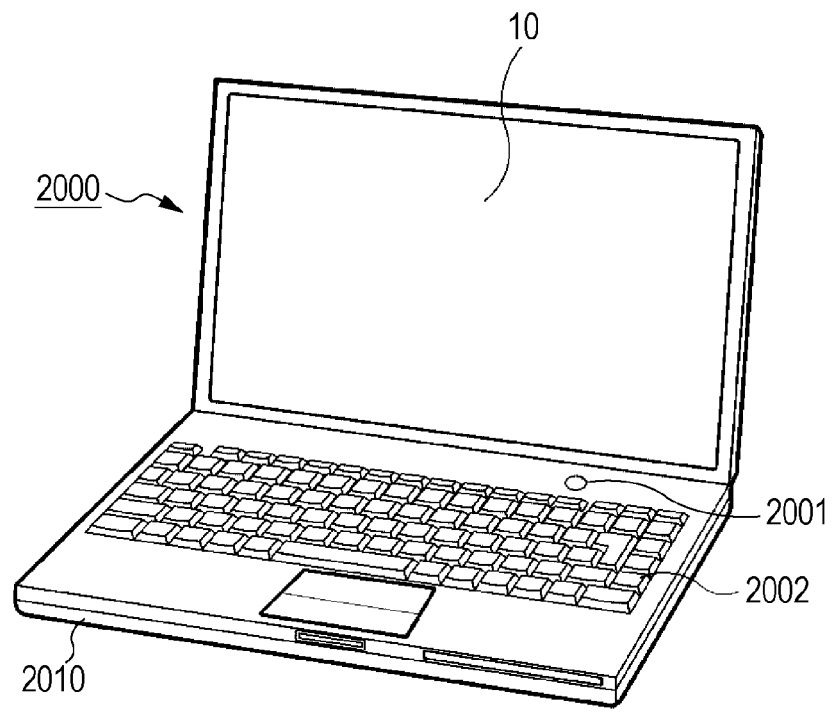
FIG. 10 is a perspective view illustrating an electronic apparatus (personal computer).
Figure 11:
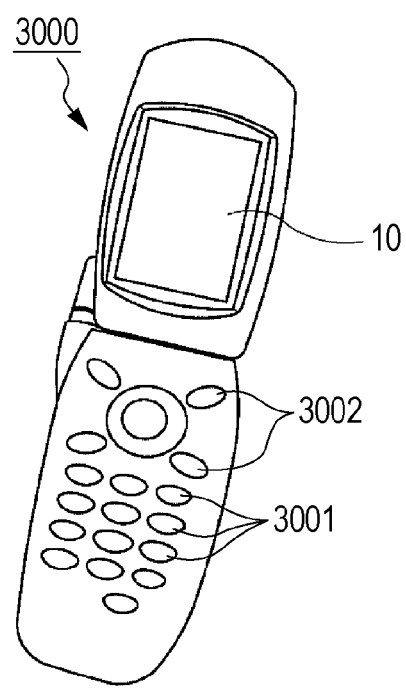
FIG. 11 is a perspective view illustrating an electronic apparatus (cellular phone).

The electro-optic device 10 exemplified in each embodiment described above may be utilized in various electronic apparatuses. FIGS. 9 to 11 show specific electronic apparatuses in which the electro-optic device 10 is utilized.

FIG. 9 is a schematic diagram illustrating a projection type display apparatus (three-plate type projector) 4000 to which the electro-optic device 10 is applied. The projection type display apparatus 4000 includes three electro-optic devices 10 (10R, 10G, and 10B) corresponding to different display colors (red, green, and blue). An illumination optical system 4001 supplies a red component r, a green component g, and a blue component b of light emitted from an illumination device (light source) 4002 to the electro-optic devices 10R, 10G, and 10B, respectively. Each electro-optic device 10 functions as an optical modulator (light valve) that modulates each single-color light supplied from the illumination optical system 4001 in accordance with a display image. A projection optical system 4003 synthesizes the light emitted from the respective electro-optic devices 10 and projects the synthesized light toward a projection surface 4004. The viewer perceives a stereoscopic image projected toward the projection surface 4004 using the stereoscopic glasses 20 (not shown in FIG. 9).

FIG. 10 is a perspective view illustrating a portable personal computer in which the electro-optic device 10 is utilized. A personal computer 2000 includes the electro-optic device 10 displaying various images and a body section 2010 in which a power switch 2001 and a keyboard 2002 are installed.

FIG. 11 is a perspective view illustrating a cellular phone to which the electro-optic device 10 is applied. A cellular phone 3000 includes a plurality of operation buttons 3001, scroll buttons 3002, and the electro-optic device 10 displaying various images. When the scroll buttons 3002 are operated, a screen displayed on the electro-optic device 10 is scrolled.

Examples of an electronic apparatus to which the electro-optic device according to the invention is applied include not only the electronic apparatuses exemplified in FIGS. 9 to 11 but also personal digital assistants (PDAs), digital still cameras, televisions, video cameras, car navigation apparatuses, in-vehicle displays (instrument panels), electronic pocket books, electronic papers, calculators, word processors, work stations, television telephones, POS terminals, printers, scanners, copy machines, video players, and apparatuses including a touch panel.

This application claims priority to Japan Patent Application No. 2011-151729 filed Jul. 8, 2011, the entire disclosures of which are hereby incorporated by reference in their entireties.

What is claimed is:

1. An electro-optic device alternately displaying right-eye image and left-eye image, comprising:
 a plurality of scanning lines;
 a plurality of signal lines;
 a plurality of pixels that are arranged to correspond to intersections between the plurality of scanning lines and the plurality of signal lines;
 a scanning line driving circuit that sequentially selects first combination of the plurality of scanning lines which being formed by two scanning lines adjacent to each other in a first unit period and sequentially selects second combination of the scanning lines which being formed by two scanning lines and shifted by one scanning line from the first combination in a second unit period, the first unit period and the second unit period being included in a display period in which the right-eye image is displayed and in a display period in which the left-eye image is displayed;
 a signal line driving circuit that supplies a gray scale potential corresponding to an image signal of a pixel corresponding to one scanning line of the first combination of the plurality of scanning lines in the first unit period and supplies a gray scale potential corresponding to an image signal of a pixel corresponding to other scanning line of the first combination of the plurality of scanning lines in the second unit period;
 stereoscopic glasses that include right-eye shutter and left-eye shutter; and
 a glasses control circuit that controls both the right-eye shutter and the left-eye shutter to a light-blocking state in the first unit periods of the display periods of the right-eye and the first unit periods of the display periods of the left-eye image, controls the right-eye shutter and the left-eye shutter to a light-transmission state and the light-blocking state, respectively, in the second unit period of the display period of the right-eye image, and controls the left-eye shutter and right-eye shutter to the light-transmission state and the light-blocking state, respectively, in the second unit period of the display period of the left-eye image;
 wherein in first control period and second control period alternately repeated, during the first control period when the signal line driving circuit supplies the gray scale potential corresponding to the image signal of the pixel corresponding to one scanning line of the first combination of the plurality of scanning lines in the first unit period and supplies the gray scale potential corresponding to the image signal of the pixel corresponding to other scanning line of the first combination of the plurality of scanning lines in the second unit period, during the second control period when supplies the gray scale potential corresponding to the image signal of the pixel corresponding to other scanning line of the first combination of the plurality of scanning line in the first unit period and supplies the gray scale potential corresponding to the image signal of the pixel corresponding to one scanning line of the first combination of the plurality of scanning line in the second control period, the signal line driving circuit sets the polarity of the gray scale potential with respect to a reference voltage to a first polarity in the first unit period, and the signal line driving circuit sets the polarity of the gray scale potential with respect to the reference voltage to a second polarity reverse to the first polarity in the second unit period.

2. The electro-optic device according to claim 1, wherein in first control period and second control period alternately repeated, during the first control period when the signal line driving circuit supplies the gray scale potential with a positive polarity with respect to a reference potential in the first unit period and supplies the gray scale potential with a negative polarity with respect to the reference potential in the second unit period, during the second control period when the signal line driving circuit supplies the gray scale potential with the negative polarity with respect to the reference potential in the first unit period and supplies the gray scale potential with the positive polarity with respect to the reference potential in the second unit period.

3. An electronic apparatus comprising the electro-optic device according to claim 1.

* * * * *